United States Patent
Epureanu

(10) Patent No.: US 9,279,739 B2
(45) Date of Patent: Mar. 8, 2016

(54) VIRTUAL NONCONTACT EXCITATION

(71) Applicant: Bogdan I. Epureanu, Ypsilanti, MI (US)

(72) Inventor: Bogdan I. Epureanu, Ypsilanti, MI (US)

(73) Assignee: The Regents of the University of Michigan, University of Michigan Office of Technology Transfer, Ann Arbor, MI (US)

( * ) Notice: Subject to any disclaimer, the term of this patent is extended or adjusted under 35 U.S.C. 154(b) by 351 days.

(21) Appl. No.: 13/866,566

(22) Filed: Apr. 19, 2013

(65) Prior Publication Data
US 2013/0276543 A1 Oct. 24, 2013

Related U.S. Application Data

(60) Provisional application No. 61/636,490, filed on Apr. 20, 2012.

(51) Int. Cl.
*G01M 7/02* (2006.01)

(52) U.S. Cl.
CPC ............... *G01M 7/02* (2013.01); *G01M 7/022* (2013.01); *G01M 7/027* (2013.01)

(58) Field of Classification Search
CPC ........ G01M 7/02; G01M 7/022; G01M 7/027
USPC ........................................................ 73/663
See application file for complete search history.

(56) References Cited

U.S. PATENT DOCUMENTS

| | | | | |
|---|---|---|---|---|
| 3,903,733 A | | 9/1975 | Murayama et al. | |
| 3,969,927 A | | 7/1976 | Yoshida et al. | |
| 4,308,482 A | * | 12/1981 | Kadohashi | 310/354 |
| 4,491,759 A | | 1/1985 | Kunz et al. | |
| 4,868,447 A | * | 9/1989 | Lee et al. | 310/332 |
| 5,182,484 A | * | 1/1993 | Culp | 310/328 |
| 5,525,853 A | * | 6/1996 | Nye et al. | 310/316.01 |
| 5,548,653 A | * | 8/1996 | Pla et al. | 381/71.2 |
| 6,087,758 A | | 7/2000 | Hino et al. | |
| 6,510,738 B1 | | 1/2003 | Lee et al. | |
| 6,720,711 B2 | * | 4/2004 | Iino et al. | 310/332 |
| 7,594,307 B2 | | 9/2009 | Morimura et al. | |
| 7,784,329 B2 | * | 8/2010 | Martinoty et al. | 73/54.01 |
| 8,024,137 B2 | * | 9/2011 | Kuehhorn et al. | 702/56 |
| 8,552,620 B2 | * | 10/2013 | Yano et al. | 310/318 |
| 2010/0078090 A1 | * | 4/2010 | Miller et al. | 138/141 |

FOREIGN PATENT DOCUMENTS

JP          61851883     *  3/1986

* cited by examiner

*Primary Examiner* — J M Saint Surin
(74) *Attorney, Agent, or Firm* — Lempia Summerfield Katz LLC

(57) ABSTRACT

An excitation system includes a pair of piezoelectric elements configured to apply respective excitation forces to a test structure, a clamp including an adjustable arm, the adjustable arm being configured to capture the test structure between the pair of piezoelectric elements, a controller coupled to the pair of piezoelectric elements and configured to generate a respective excitation control signal for each piezoelectric element, each excitation control signal being configured such that the respective excitation forces are matched to one another, and a pair of sensor film structures to generate respective output signals indicative of the excitation forces applied to the test structure, each sensor film structure being disposed between a respective one of the pair of piezoelectric elements and the test structure.

21 Claims, 3 Drawing Sheets

VIRTUAL NONCONTACT EXCITATION

CROSS-REFERENCE TO RELATED APPLICATION

This application claims the benefit of U.S. provisional application entitled "Virtual Noncontact Excitation," filed Apr. 20, 2012, and assigned Ser. No. 61/636,490, the entire disclosure of which is hereby incorporated by reference.

BACKGROUND OF THE DISCLOSURE

1. Field of the Disclosure

The disclosure relates generally to vibration testing.

2. Brief Description of Related Technology

Vibration testing of very flexible, light, or lightly damped structures is often conducted by exciting the structure without contact. Noncontact excitation avoids adding mass, stiffness, or damping to the test structure. One example of noncontact excitation is acoustic-based excitation. Speakers are used to provide the excitation force. However, such acoustic excitation systems are only capable of transmitting very low forces and very low amounts of power to the test structure.

Speaker-based excitation systems may also be unsuitable for excitation of structures with complex geometry due to space constraints. Speakers are not practical for excitations at high frequencies due to the large amount of power involved. The large power may be available, but the power comes at the cost of large size. The large size of the test system may render the acoustic approach impractical for structures with complex geometry. For example, acoustically exciting the blade of a turbomachinery bladed disk at high frequencies may not be possible because the speaker has large size and thus cannot fit between two adjacent blades.

Other excitation systems provide mechanical excitation via direct contact. For example, the use of stingers may provide direct forces to the excited structure. However, these methods involve contact between the stinger and the structure being tested. The properties of the test structure (e.g., mass, stiffness, and/or damping) may be changed due to interaction with the stinger.

SUMMARY OF THE DISCLOSURE

In accordance with one aspect, an excitation system includes a pair of piezoelectric elements configured to apply respective excitation forces to a test structure, a clamp including an adjustable arm, the adjustable arm being configured to capture the test structure between the pair of piezoelectric elements, a controller coupled to the pair of piezoelectric elements and configured to generate a respective excitation control signal for each piezoelectric element, each excitation control signal being configured such that the respective excitation forces are matched to one another, and a pair of sensor film structures to generate respective output signals indicative of the excitation forces applied to the test structure, each sensor film structure being disposed between a respective one of the pair of piezoelectric elements and the test structure.

The adjustable arm may be positioned such that the pair of piezoelectric elements, the pair of sensor film structures, and the test structure are clamped under a compressive force during application of the excitation forces.

In some embodiments, each piezoelectric element includes a respective piezoelectric stack, each piezoelectric stack including a plurality of piezoelectric layers.

The clamp may be configured such that the respective excitation forces are collinear. Alternatively or additionally, the control signals are configured such that the respective excitation forces are equal. Alternatively or additionally, the control signals are configured such that the respective excitation forces are synchronized to displace the test structure in a common direction. Alternatively or additionally, the pair of piezoelectric elements are configured such that each excitation force is applied orthogonally to a respective surface of the test structure.

In some embodiments, each sensor film structure includes a piezoelectric layer configured to present a mass negligible relative to a mass of the test structure. Each piezoelectric layer may include a polyvinylidene fluoride layer.

The excitation system may also include a further piezoelectric element in contact with the clamp and positioned to suppress a vibration mode of the clamp. The further piezoelectric element may be coupled to the controller. The controller may then be further configured to generate a vibration suppression control signal configured such that the further piezoelectric element suppresses the vibration mode of the clamp. In some cases, the further piezoelectric element may include a piezoelectric patch disposed on the adjustable arm of the clamp. Alternatively or additionally, the clamp may be configured with a mass such that respective resonant frequencies of the clamp and the test structure are spaced from one another. These and other active or passive vibration suppression techniques may be used to cause the excitation forces to be reflected at interfaces with the test structure rather than propagating through the clamp.

In some embodiments, the excitation system also includes a vibrometer disposed adjacent the test structure for optical communication with the test structure to obtain an indication of a motion response to the excitation forces applied to the test structure.

In accordance with another aspect, a method of force measurement in an excitation system including a pair of piezoelectric elements includes applying matching excitation forces via the pair of piezoelectric elements to a test structure compressed between the pair of piezoelectric stacks, and measuring the applied excitation forces via a pair of sensor film structures, each sensor film structure being disposed between a respective one of the pair of piezoelectric elements and the test structure.

In some embodiments, applying the excitation forces includes generating a respective control signal for each piezoelectric element. The control signals may be configured such that the respective excitation signals are equal and synchronized to displace the test structure in a common direction.

The method may also include suppressing motion in a clamp used in compressing the test structure. Suppressing the motion may include providing a suppression control signal to a piezoelectric patch disposed on the clamp.

In some embodiments, the method also includes capturing data indicative of motion of the test structure in response to the applied matching excitation forces.

BRIEF DESCRIPTION OF THE DRAWING FIGURES

For a more complete understanding of the disclosure, reference is made to the following detailed description and accompanying drawing figures, in which like reference numerals identify like elements in the figures.

Figure 1:
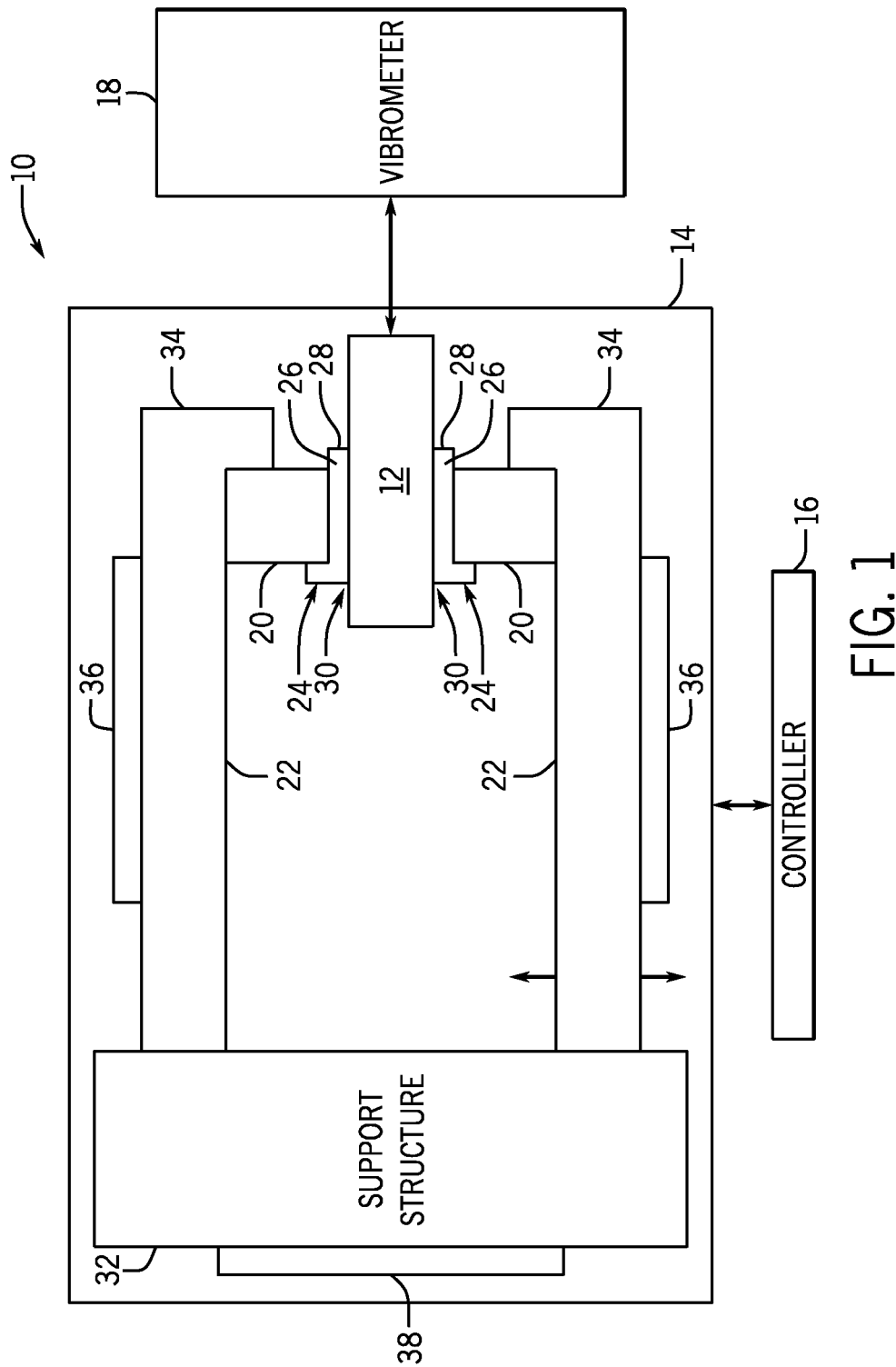
FIG. 1 is a block diagram of an excitation system configured to measure an excitation force applied to a test structure in accordance with one embodiment.

While the disclosed systems and methods are susceptible of embodiments in various forms, specific embodiments are illustrated in the drawing figures (and will hereafter be described), with the understanding that the disclosure is intended to be illustrative, and is not intended to limit the invention to the specific embodiments described and illustrated herein.

DETAILED DESCRIPTION OF THE DISCLOSURE

The disclosure relates to excitation systems and methods. The excitation systems and methods may be useful in connection with vibration and other testing of a structure to which an excitation force is applied. The disclosed excitation systems and methods are configured to apply excitation forces in a manner that provides the benefits of a noncontact system without the typical disadvantages thereof. For example, the disclosed excitation systems and methods may avoid introducing errors through changes to the mass, stiffness, damping, or other characteristics of the test structure. The disclosed excitation systems and methods may provide the excitation force in a virtually or effectively noncontact manner to limit any mass, stiffness, damping, and/or other changes to the test structure to negligible levels.

The disclosed excitation systems and methods may provide the excitation forces while measuring the excitation forces applied to the test structure. The disclosed excitation systems may be configured to measure one or more parameters of the applied excitation force. The measured parameter(s) may include, for instance, the magnitude, amplitude, and/or frequency of the applied excitation force. Through such measurements, an accurate excitation force of known characteristics (e.g., frequency and amplitude) may be applied to the test structure. The applied forces may be normal forces and/or shear forces.

The disclosed embodiments may include sensors and actuators (or exciters) placed at the same location (e.g., collocated sensors and actuators). However, the same elements are not used for both sensing and excitation. With separate elements for excitation and sensing, the disclosed embodiments may be capable of applying a large excitation force with a large excitation element, but without relying on the large amount of mass and stiffness added by the large excitation element for sensing. The sensing element may, in contrast to the excitation element, be light and small for low added mass, stiffness, and/or damping. Large excitation forces may thus be applied without the detrimental effects of the large mass and stiffness of the excitation element.

The disclosed excitation systems and methods may measure the applied excitation forces with thin film piezoelectric sensors or other sensor film structures that have a negligible effect on the test structure. As described below, the piezoelectric sensing elements may include thin polyvinylidene fluoride (PVDF) layers. The sensor film structures are not used to generate the excitation force, but allow the excitation force to reach the test structure while also measuring the force. The sensor film structures may measure the excitation forces despite having a light mass (e.g., relative to the mass of the test structure).

The disclosed excitation systems may include piezoelectric elements to generate and/or provide the excitation forces. The piezoelectric elements may include piezoelectric stacks. The piezoelectric elements are positioned to apply the excitation forces indirectly to the test structure. The force sensors are positioned between the piezoelectric elements and the test structure. A pair of piezoelectric elements may be disposed along or at opposite sides of the test structure. Using the pair of piezoelectric elements may establish two contact points on the test structure (e.g., on the opposite sides).

The excitation forces applied by the pair of piezoelectric elements may be matched. In some cases, the excitation forces may be collinear, opposing, and/or in the same direction. For example, the excitation forces may be opposing or opposite in the effects that the excitation forces have on the test structure, such that one stack expands when the other contracts. In some examples, the magnitudes of the excitation forces are also equal.

A clamp may be used to maintain contact between the piezoelectric elements, the sensor film structures, and the test structure. The positioning of arms or other portions of the clamp may be adjustable. The position adjustments may be used to provide a pre-stress force and maintain contact throughout the duration of the excitation. The position adjustments may also allow the disclosed embodiments to accommodate a variety of different test structures. The disclosed embodiments are thus well suited for use with test structures of varying shapes, sizes, and components. The adjustment of an arm or other portion of the clamp may allow the excitation force applied by the piezoelectric elements to be perpendicular to the surface of the test structure at the contact points.

The disclosed excitation systems are configured such that a respective force sensor is disposed between each piezoelectric stack and the structure. The forces are thus applied to the test structure indirectly, e.g., through or via the force sensors. For instance, each force sensor may be attached to an end or side of a respective one of the piezoelectric stacks that faces the test structure. The force sensors may be thin to minimize or reduce the mass thereof. The force sensors may thus introduce minimal or negligible mass, stiffness, damping, or other effects on the test structure, despite contact with the test structure. The contact with the test structure allows sufficient power to be delivered to the test structure. The force sensors may measure forces applied normal to the surface of the test structure and/or shear forces.

Despite the direct or indirect contact of the piezoelectric sensing elements and piezoelectric stacks with the test structure, the disclosed systems and methods nonetheless act as if the excitation forces are applied in a noncontact manner. Such contact notwithstanding, the disclosed excitation systems and methods may eliminate, reduce, or suppress the typical effects of a stinger or other exciter, such as added mass, added stiffness, added damping, and geometrical effects. The disclosed excitation systems and methods may accordingly be referred to herein as "virtual noncontact" excitation systems and methods.

The configuration or construction of the disclosed excitation systems may vary to accommodate different test structure sizes, shapes, and complex geometries. For instance, a clamp and/or other components of the disclosed systems may be modified from the examples described below. Although described in connection with a plate-shaped or thin test structure, such as a blade of a turbomachinery bladed disc or other turbomachinery component, the disclosed excitation systems and methods are well suited for use with a variety of different types of test structures.

FIG. 1 depicts an example of an excitation system 10 constructed in accordance with one embodiment. The excitation system 10 is configured to apply and measure excitation forces applied to a test structure 12. In this example, the excitation system 10 includes a clamp 14, a controller 16, and a vibrometer 18. The controller 16 is configured to direct the application and measurement of the excitation forces to the test structure 12 by the clamp 14. The vibrometer 18 may be used to measure the motion resulting from the application of the excitation force. When characteristics of the test structure 12 are known, the measured motions can be correlated with the applied forces. Hence, the vibrometer 18 may be used to provide further information regarding the excitation forces.

The components of the excitation system 10 directed to excitation and sensing may be integrated with the structural components of the clamp 14. In this embodiment, the clamp 14 includes a pair of piezoelectric elements 20 configured to apply respective excitation forces to the test structure 12, a pair of arms 22 engaging the piezoelectric elements 20, and a pair of sensor film structures 24 disposed between the piezoelectric elements 20 and the test structure 12. In some embodiments, the sensor film structures 24 are configured as piezoelectric sensors. Other types of pressure and/or shear force sensors may be used. For example, resistive or capacitive sensors may be used. The piezoelectric elements 20 may be configured to act as exciters or excitation components of the excitation system 10. The excitation and sensing components of the excitation system 10 may be integrated with the structural components of the clamp 14 to any desired extent.

The positions of one or both of the arms 22 may be adjustable. In this example, one of the pair of arms 22 is adjustable in the directions indicated in FIG. 1. The adjustment of the arm(s) 22 allows the clamp 14 to capture the test structure 12 between the pair of piezoelectric elements 20. The adjustment may also allow the clamp 14 to pre-stress or compress the test structure 12 before the application of the excitation force. For example, the pre-stress or compression force may fall in the range of about 0.1 N to about 100 N.

The controller 16 is coupled to the pair of piezoelectric elements 20 and configured to generate a respective excitation control signal for each piezoelectric element 20. Each excitation control signal may be configured such that the respective excitation forces are matched to one another. The controller 16 may also be coupled to the pair of sensor film structures 24 to receive respective output signals generated by the sensor film structures 24. The output signals are indicative of the excitation forces applied to the test structure. Each sensor 24 is disposed between a respective one of the pair of piezoelectric elements 20 and the test structure 12 to enable the excitation and force measurement in an effectively non-contact manner.

The effective or virtual nature of the noncontact excitation provided by the excitation system 10 involves actual mechanical contact between components of the excitation system 10 and the test structure 12. However, the excitation is applied in such a way that the mass, stiffness, and damping effects on the test structure 12 are small and/or negligible. In some cases, the sensor film structures 24 are configured as very light force (normal and/or shear) sensors (e.g., thin film sensors) to achieve such virtual or effective noncontact. Each sensor 24 may be otherwise configured to present a mass negligible to the test structure 12.

In the embodiment shown in FIG. 1, each sensor film structure 24 includes a thin piezoelectric layer or membrane 26 and a thin conductive (e.g., gold) coating 28 covering the thin piezoelectric layer 26. The piezoelectric layer 26 may include or be made of polyvinylidene fluoride (PVDF). Additional or alternative piezoelectric materials may be used. The thickness of the piezoelectric layer 26 may be, for example, on the order of several tens of microns. Other thicknesses may be used.

Each sensor film structure 24 may be configured as a light sensor. The mass of each sensor film structure 24 may be significantly less than the mass of the test structure. In some embodiments, the difference in the masses may be about two orders of magnitude. For example, each sensor film structure 24 may have a mass in a range from about 0.02 milligrams to about 1 milligram. Masses that fall in that range may be useful when the test structure 12 has a mass in a range from about 10 grams to about 10 kilograms. The mass of each sensor film structure 24 may vary, including in those embodiments in which the test structure 12 has a mass outside of the above-referenced exemplary range.

The thickness of the gold coating 28 may be, for example, a few microns. Other thicknesses may be used. Additional or alternative materials may be used for as a coating or contact layer(s) of the sensor film structures 24. The sensor film structures 24 may have any number of coating layers.

The sensor film structures 24 provide sensor signals (S1, S2) that are proportional to the forces applied by the excitation system 10 to the test structure 12 at interfaces 30. The controller 16 may be coupled to or otherwise in communication with each sensor film structure 24 to receive or obtain the sensor signals.

To generate the excitation forces, the sensor film structures 24 are pressed upon the test structure 12 by the piezoelectric elements 20. Each piezoelectric element 20 may be include a respective piezoelectric stack. Each piezoelectric stack may include any number of piezoelectric layers or elements. Each piezoelectric element 20 may provide an excitation displacement proportional to an electrical excitation signal generated by the controller 16. The piezoelectric elements 20 may provide excitation forces at various frequencies. In some embodiments, the excitation forces have a frequency that falls in a range from about 800 Hz to about 80 kHz. Other frequencies may be used.

The magnitude of the excitation force may also vary. In one example, the amplitude of the collective or aggregate excitation force generated by the pair of piezoelectric elements 20 ranges up to about 0.75 N. The excitation forces applied by the disclosed excitation systems may thus be much larger than those provided by acoustic-based excitation systems.

In some embodiments, the excitation forces generated by the piezoelectric elements 20 are synchronized or otherwise matched or to one another. For example, the piezoelectric elements 20 may be coupled to, and directed by, the controller 16 to expand and contract simultaneously. Such synchronization of the excitation forces may displace or shift the test structure 12 in a common direction. For instance, at one point during an excitation cycle, one of the piezoelectric elements 20 (e.g., the stack engaged by the stationary arm 22) is directed to expand while the other piezoelectric element 20 (e.g., the stack engaged by the adjustable arm 22) is directed to contract. As a result, excitation forces are applied to the test structure 12 that tend to shift the test structure 12 downward toward the stack engaged by the adjustable arm 22. The excitation forces may thus be collinear in these and other cases. The matching of the excitation forces may involve other types of collinearity. The control signals may also be configured such that the excitation forces are equal in magnitude (and opposite in contraction versus expansion). In other cases, the excitation forces are not collinear. For example, the axes of the two piezoelectric elements 20 may be parallel but not the same (e.g., one may be offset with respect to the other). In those cases, the excitation forces are parallel but not collinear.

The structural components of the clamp 14 of the excitation system 10 may secure or otherwise capture the test structure 12 in position for application and measurement of the excitation forces. The piezoelectric elements 20 may be pre-compressed on the test structure 12 and held in place by the clamp 14. One or both of the arms 22 may be positioned such that the pair of piezoelectric elements 20, the pair of sensor film structures 24, and the test structure 12 are clamped under a compressive force during application of the excitation forces. In one example, a minimum static compressive force of about 0.25 N is applied to the test structure 12 by the clamp 14. Such pre-compression may ensure that there is no loss of contact at the interfaces 30 during excitation. For instance, the pre-compression may ensure that the relative positions of test structure 12 and the excitation and sensing components of the excitation system 10 remain effectively unchanged during the vibration or motion resulting from the excitation. The positions (e.g., vertical positions) of the interfaces 30 or contact points between the excitation system 10 and the test structure 12 are permitted to shift with the movement of the test structure 12 without loss of contact at the interfaces 30.

In the embodiment shown in FIG. 1, the clamp 14 includes a support structure 32. The support structure 32 may be configured as or include a base from which the arms 22 are cantilevered. The support structure 32 may support the arms 22 above a rest surface, such as a horizontal, linear table. One example of the support structure 32 is shown and described below in connection with FIG. 2. The shape, size, and other characteristics of the support structure 22 may vary considerably from the example shown. Each arm 22 of the clamp 14 may have an L-shaped end 34 configured to secure the piezoelectric element 20 in place. Other shapes may be used to constrain or capture the piezoelectric elements 20. The arms 22 and the L-shaped ends 34 may be sized and/or shaped to expose the test structure 12 to the optical signals generated or received by the vibrometer 18.

The support structure 32 and the arms 22 may have a rigid construction. The materials, construction, dimensions, and characteristics of the arms 22 may be selected to minimize or avoid deflection or displacement during application of the excitation forces. For example, the arms 22 may be thicker or thinner, or may have masses added or removed to avoid the presence of vibration modes of the support structure 32 with frequencies in the frequency range of interest for testing. Notwithstanding the foregoing, the arms 22 and/or other components of the clamp 14 may be configured to withstand displacements during excitation of about 2 microns or more. A variety of materials may be used to construct the support structure 32 and the arms 22.

The clamp 14 may be adjustable to accommodate different types of test structures 12. Test structures 12 having varying thicknesses may thus be captured. The position of one or both of the arms 22 may be adjustable to vary the distance between the arms 22 and, as described above, to provide pre-compression to ensure that the contact at the interfaces 30 is not lost during excitation. The positioning of the arm(s) 22 and, thus, the clamping force, may be adjustable via a screw or other mechanism. For example, the clamping force may be adjustable to a precision of about ±0.001 N.

The adjustability of the clamp 14 may also be used to orient the piezoelectric elements 20 such that the excitation forces are applied orthogonally to the surfaces of the test structure 12 at the interfaces 30. In the example shown in FIG. 1, the test structure 12 has parallel surfaces at the interfaces 30 that are engaged by the excitation system 10. In other examples, the shape of the test structure 12 may vary, and thus may present or include shapes having non-parallel surfaces at the interfaces 30. In those cases, shear forces may be applied to the text structure 12 in addition to normal forces. When shear forces are applied, the sensor film structures 24 which measure the normal force applied to the test structure 12 may be replaced by or augmented with shear sensor film structures to measure the amount of shear force applied by the excitation system 10 to the test structure 12.

The clamp 14 may be configured to accommodate capturing thin test structures 12, such as those having a plate-like shape or plate-like component. The clamp 14 may be sized such that the arms 22 and other portions of the clamp 14 avoid interfering with other (e.g., adjacent) components of the test structure 12. For example, the clamp 14 may be configured such that a spacing of about 10 mm or more is provided between other (e.g., adjacent) components of the test structure 12. In one example, the piezoelectric elements 20 contact a plate-like test structure (or component thereof) at a distance of about 20 mm or more relative to the edge of the plate-like test structure (or component thereof). For example, the plate-like test structure to be excited by the excitation system 10 may be one of the blades of a turbomachinery bladed disk. The clamp 14 may be configured such that only a single blade of the disk is contacted by the excitation system 10. The disk or other, neighboring blades are not contacted.

The clamp 14 may also be configured for compatibility with measurements by the vibrometer 18. For example, the ends 34 and other components of the arms 22 may be configured to avoid blocking or obstructing one or more laser beams or other optical signals generated by the vibrometer 18. The vibrometer 18 may be disposed adjacent the test structure 12 for optical communication with the test structure 12 to obtain an indication of the motion response to the excitation forces. The optical signals may be used for Doppler velocimetry measurement of the motion response of a surface of the test structure 12. The laser signal(s) may be directed at any surface of the test structure 12. The laser signal(s) may be directed at one of the surfaces to which the excitation force is applied. The vibrometer 18 and the laser signal are depicted schematically in FIG. 1. One or more optical components (e.g., mirrors) may be used to direct the laser signal to one or more of the surfaces of the test structure 12.

The contact area of the interfaces 30 between the sensor film structures 24 and the test structure 12 may be minimized. As shown in FIG. 1, the sensor film structures 24 rather than the piezoelectric elements 20 are in contact with the test structure 12. In some embodiments, the excitation forces may be applied to the test structure 12 at specific points, or small areas at or near such specific points. For example, the area(s) may be smaller than the area of the piezoelectric elements 20. Thus, each piezoelectric sensor 24 need not extend entirely across the lateral dimensions of the piezoelectric element 20 as shown in FIG. 1. The sensor film structure 24 may instead have lateral dimensions smaller than the piezoelectric element 20.

In some cases, the excitation system 10 may include one or more intermediate layers, objects, or elements disposed between the piezoelectric elements 20 and the sensor film structures 24. These intermediate elements may have a cross sectional area (parallel to the surface of the test structure 12) smaller than that of the piezoelectric elements 20. Thus, such intermediate elements may be configured to ensure that the sensor film structures 24 are pressed against the test structure 12 on the smaller area of the sensor film structure 24. Such intermediate elements may include one or more materials having a high stiffness, such as a stiffness greater than the stiffness of the sensor film structures 24 and/or the piezoelectric elements 20.

In some embodiments, vibrations in the clamp 14 are suppressed to ensure that the excitation forces are directed to the test structure 12. One or more vibration modes may be suppressed. The mode(s) may correspond with the frequencies in the frequency range of interest for testing. Such vibration suppression may be provided by one or more piezoelectric patches applied to the structural components of the clamp 14. In the example of FIG. 1, piezoelectric patches 36 are applied to the arms 22, and a piezoelectric patch 38 is applied to the support structure 32. The piezoelectric patches 36, 38 may include lead zirconate titanate (PZT) or other piezoelectric materials. One or more of the piezoelectric patches 36, 38 may be applied to other component(s) of the clamp 14.

The controller 16 may be configured to generate respective control signals for the piezoelectric patches 36, 38. The control signals may be configured to ensure vibration suppression at or near the frequency (or frequencies) of the excitation forces. Alternatively, a separate controller or processor may be used to control the vibration suppression. Modal analysis of the clamp 14 may be conducted to identify mode shapes and frequencies for the clamp 14 to guide or optimize the configuration of the control signals and/or the piezoelectric patches 36, 38. Such suppression may also assist in maintaining contact at the interfaces 30 with the test structure 12. The positions of the piezoelectric patches 36, 38 may vary.

Other techniques to dampen or minimize vibrations in the clamp 14 may be used. For example, a passive piezoelectric technique may include one or more piezoelectric patches connected to respective resistors. Any type of resistive load may be used. Such patches may be located in positions similar to those shown in FIG. 1. Other examples involve non-piezoelectric materials or damping structures. For instance, mass may be added to the clamp 14 at one or more positions to shift a resonant frequency of the clamp 14 (or component thereof) away from the excitation frequencies and/or resonant frequency of the test structure 12. FIG. 1 provides one example in which one or more of the above-referenced piezoelectric patches 36, 38 instead provide the mass for damping. These and other active or passive vibration suppression techniques may be used to cause the excitation forces to be reflected at the interfaces 30 with the test structure 12 rather than propagating through the clamp 14. Alternatively or additionally, these techniques may be used to ensure that the resonant frequencies of the clamp 14 (or a component thereof) and the test structure 12 are spaced from one another.

An example of the operation of the above-described excitation system 10 is provided. Each sensor film structure 24 may be configured as a piezoelectric sensor, which acts as a force sensor disposed between the test structure 12 and one of the piezoelectric elements 20 (e.g., piezoelectric stacks) acting as an exciter. During operation, the actual force applied to the test structure 12 is measured.

The applied force may depend on the response of the test structure 12. In one example, the piezoelectric elements 20 are driven by respective 100 V control signals from the controller 16. For one test structure A, the resulting excitation leads to a force of 1 N. A different test structure B may have one or more distinct structural properties differing from test structure A that lead to a different applied force, e.g., 2 N, despite the use of the same exciter and the same applied voltage (i.e., the same voltage magnitude and frequency). The applied forces may differ because the forces depend on the motion of the test structure 12. The excitation system 10 may thus be used to accurately measure the excitation force as applied to a given test structure.

In some embodiments, the controller 16 may be configured to adjust the voltages (e.g., in magnitude and/or phase) to provide the same excitation force across different test structures. Additionally or alternatively, the controller 16 may adjust the control voltages to provide distinct force amplitudes and phase for each test structure, as desired. The excitation system 10 may thus allow an operator (or the controller) to adjust the control voltage applied to the piezoelectric elements 20 to reach or generate a desired amplitude for the applied force. The control voltage may be adjusted in both amplitude and/or phase.

The controller 16 may be configured to generate control voltages that provide simultaneous excitation of the test structure 12 at multiple locations of the test structure 12. Such simultaneous excitation may be configured with prescribed phase differences, which may be useful in applying, for instance, travelling wave excitation. In some cases, the excitation system 10 includes multiple controllers 16 (e.g., one controller for each location) to produce such simultaneous excitation. Alternatively, multiple excitation systems 10 may be used.

In some cases, the voltage adjustments may be part of an iterative routine or procedure implemented by the controller 16. For example, the controller 16 may initially direct the excitation system 10 to apply a first voltage. The resulting force may then be measured by the excitation system 10 as described herein. The controller 16 may then adjust the excitation voltage based on the force measurement. The adjustment may be directed to moving the resulting excitation force to a desired level. Further force measurements and voltage adjustments may be implemented until the resulting force reaches the desired excitation force.

The controller 16 may be configured to implement the iterative procedure and reach a desired force level in an automated manner. For example, a desired force level may be reached for a given test structure without operator intervention after initiating execution of the procedure. Further details are described below in connection with the exemplary method of FIG. 3.

The controller 16 may include one or more processors, such as microprocessors. The controller 16 may include multiple controllers or processors for respectively controlling, directing, or otherwise communicating with one or more of the above-described system components (e.g., the sensor film structures 24, the piezoelectric elements 20 or exciters, the piezoelectric patches 36, 38 or vibration suppressors, etc.). For example, a separate oscilloscope may be used to receive and collect the signals from the sensor film structures 24.

The processor(s) of the controller 16 may be a component of a variety of different computing or other devices or systems. For example, the processor may be part of a standard personal computer or a workstation. The processor(s) may be part of an electronic instrument configured to generate one or more of the above-described control signals. The processor(s) may be part of an electronic instrument configured to receive and process signals from the sensor film structures 24. Such devices and systems may be integrated to any desired extent in one or more general processors, digital signal processors, application specific integrated circuits (ASICs), field programmable gate arrays, servers, networked computing architectures, digital circuits, analog circuits, combinations thereof, or other now known or later developed devices for analyzing and processing data. The processor(s) may implement one or more software programs. The processor is not limited to a central processing unit (CPU) of a computer.

The controller 16 may include a memory in which instructions and other data are stored in connection with implementing the disclosed embodiments. The instructions stored in the memory may be executable by the processor(s) to cause the processor(s) to implement one or more aspects of the excitation procedures. The memory may communicate with the processor(s) via a bus. The memory may be a main memory, a static memory, and/or a dynamic memory. The memory may include a computer readable storage medium, such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The computer-readable storage medium may be or include a single medium or multiple media, such as a centralized or distributed data store. In one case, the memory may include a cache or random access memory of or for the processor(s). Alternatively or additionally, the memory may be integrated with the processor(s) to any desired extent. The memory may include or be an external storage device or database for storing data. Examples include a hard drive, compact disc ("CD"), digital video disc ("DVD"), memory card, memory stick, floppy disc, universal serial bus ("USB") memory device, or any other device operative to store data.

The functions, acts or tasks illustrated in the figures or described herein may be performed by the programmed processor executing the instructions stored in the memory. The functions, acts or tasks may be independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like.

The controller 16 (or the excitation system 10) may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for an operator of the excitation system 10 to depict, for example, the operation of the controller 16 (or processor thereof).

The controller 16 (or the excitation system 10) may include an input device configured to allow an operator to interact with the controller 16 and/or other component of the excitation system 10. The input device may be a number pad, a keyboard, touchscreen, or a cursor control device, such as a mouse, or a joystick, touch screen display, remote control or any other device operative to interact with the controller 16 (or the excitation system 10).

Figure 2:
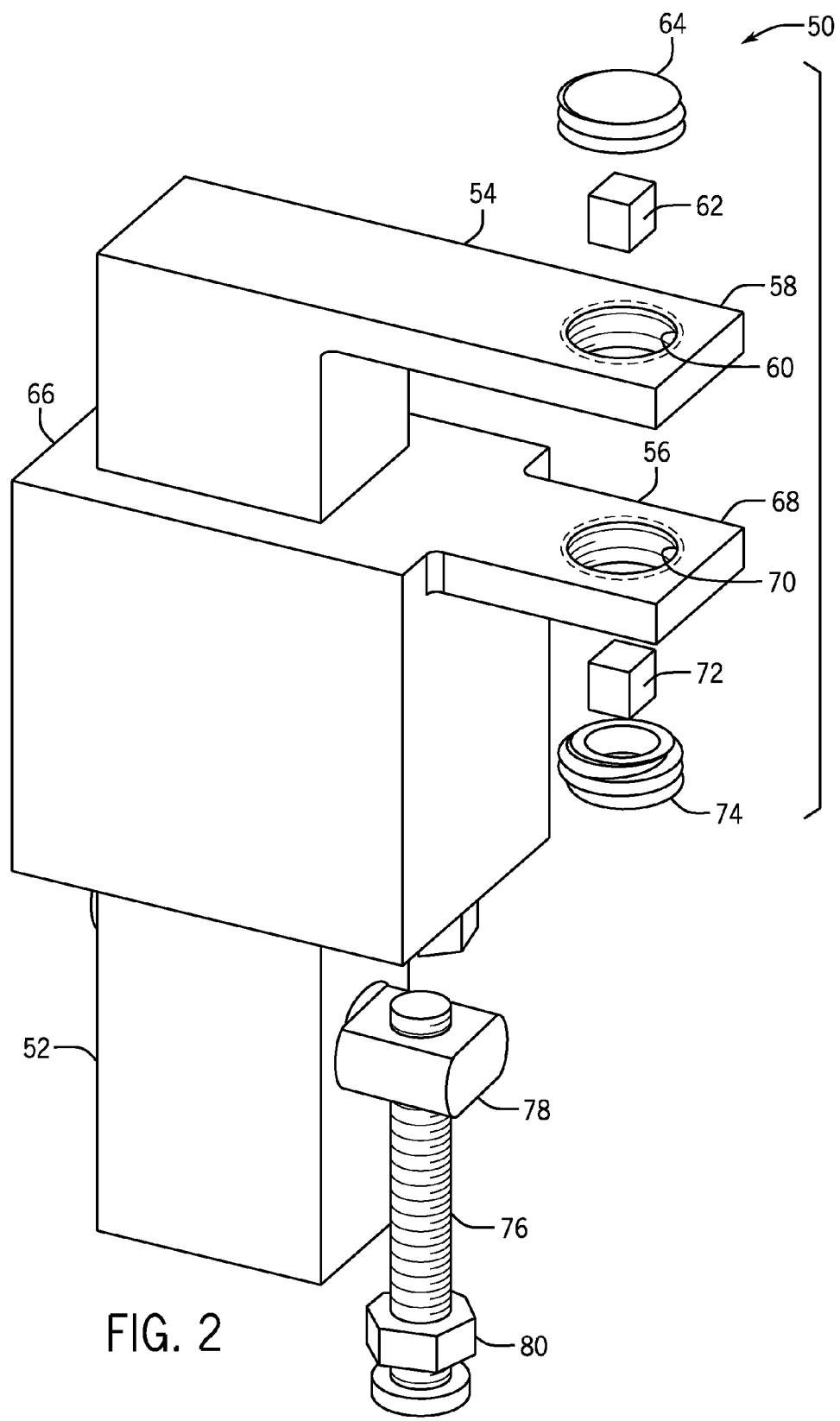
FIG. 2 is a perspective, exploded view of a clamp of the excitation system of FIG. 1 in accordance with one embodiment.

FIG. 2 depicts one example of a clamp 50 for use in connection with the disclosed embodiments. The clamp 50 is configured as a vise assembly having a support structure 52, a stationary arm 54 cantilevered from an upper end of the support structure 52, and an adjustable arm 56 slidably engaged with the base 52. In this example, the support structure 52 is post-shaped. Other shapes may be used. The support structure 52 may include a base or platform on which a post or other component of the support structure 52 is mounted. The stationary arm 54 may be integrally formed with the support structure 52.

The stationary arm 54 includes a strip-shaped extension 58 in which a hole 60 is formed to receive a piezoelectric exciter element 62. In this example, the hole 60 is threaded to receive a screw 64. The screw 64 may be configured to position and/or secure the piezoelectric exciter element 62 within or adjacent the hole 60. A piezoelectric sensor (not shown) may be adhesively or otherwise secured to the piezoelectric exciter element 62.

The adjustable arm 56 also includes a sleeve 66 from which a strip-shaped extension 68 projects to define a spacing from the arm 54 in which a test structure is captured. The strip-shaped extension 68 includes a hole 70 to receive a piezoelectric exciter element 72. The hole 70 may be threaded to receive a screw 74. The screw 74 may be configured to position and/or secure the piezoelectric exciter element 72 within or adjacent the hole 70. A piezoelectric sensor (not shown) may be adhesively or otherwise secured to the piezoelectric exciter element 72.

The assembly of the clamp 50 further includes an adjustment screw 76 to position the adjustable arm 56 along the support structure 52 and reach a desired spacing between the arms 54, 56. In this example, the adjustment screw 76 is carried by a threaded fixture 78 mounted on the support structure 52. The adjustment screw 76 may be configured as a bolt having a precision nut 80. The adjustment screw 76 may be used to provide a pre-excitation stress or compression force as described above.

In alternative embodiments, multiple adjustment screws are provided. For example, another adjustment screw may be provided on a side of the support structure 52 opposite the side having the fixture 78. In some cases, one or more adjustment screws are configured for coarse adjustments, and/or one or more adjustment screws are configured for precision adjustments. The coarse adjustments may be used to establish a desired spacing. The precision adjustments may then be used to adjust the pre-stress force applied to the piezoelectric exciter elements 62, 72.

A small set screw (not shown) may be used to maintain the positions of the above-described components, including, for instance, the screws 64, 74, and the adjustment screw 76. Other types of fasteners or supports may be used. The assembly may include further set screws or other fasteners directed to positioning the piezoelectric exciter elements 62, 72. For example, the piezoelectric exciter elements 62, 72 may be embedded or otherwise disposed in such set screws or fasteners.

The structural characteristics of the clamp 50 may vary. For example, the clamp 50 need not be configured as a vise assembly. One alternative clamp structure may include structure resembling a pair of scissors in which the excitation stacks 62, 72 and the screws 64, 74 are disposed at the tip of the scissors, and in which the precision nut is disposed at a handle of the pair of scissors. In some embodiments, the precision nut is replaced by a precision screw connected to an actuator such as an electric motor.

Figure 3:
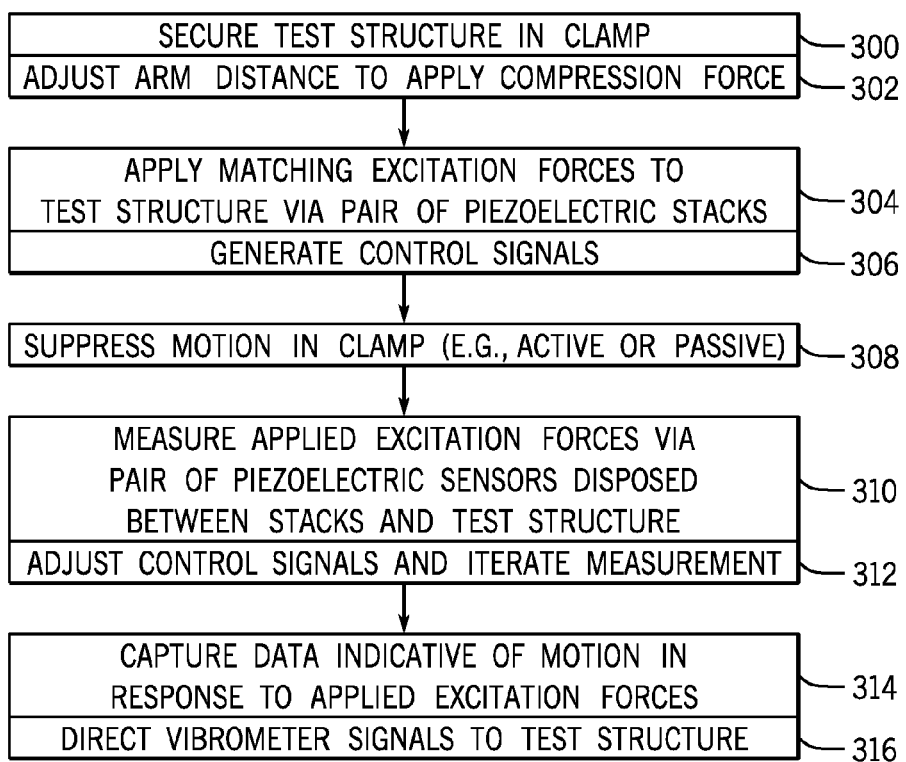
FIG. 3 is a flow diagram of a method of excitation measurement in accordance with one embodiment.

FIG. 3 depicts a method of excitation force measurement in accordance with one embodiment. The method may be implemented using one of the above-described excitation systems. One or more of the acts of the method may be implemented by the controllers or processors described above.

The method may begin in an act 300 in which a test structure is compressed between a pair of piezoelectric elements (e.g., stacks). For example, a spacing between arms of a clamp may be adjusted in an act 302 to accommodate the size of the test structure and/or reach a desired level of pre-excitation compression.

Once the test structure is secured, excitation forces may be applied to the test structure in an act 304 via the pair of piezoelectric elements. For example, a controller may be used to generate control signals for the piezoelectric elements in an act 306. The control signals may be configured such that the respective excitation forces are matched as described above. For example, the excitation forces may be equal and synchronized to displace the test structure in a common direction.

In an act 308, vibration or other motion in the clamp arm (or other clamp component) used in securing the test structure may be suppressed as described above. For example, such motion may be suppressed by providing a suppression control signal to a piezoelectric patch disposed on the clamp. Such suppression may be provided during the application of the excitation forces. Active or passive suppression techniques may be used.

During or after one or more of the aforementioned acts, the applied excitation forces are measured in an act 310 via a pair of sensor film structures, such as thin film piezoelectric sensors. Each piezoelectric sensor is disposed between a respective one of the pair of piezoelectric stacks and the test structure, as described above.

In some embodiments, the excitation control signals are adjusted in an act 312 based on the excitation force measurement. The adjustment may be part of an iterative procedure in which the control signals are adjusted until a desired force level is reached. For example, the controller may apply an initial voltage V (e.g., a complex quantity including phase and amplitude information) to the piezoelectric elements. A difference S (e.g., a complex quantity containing phase and amplitude information) between the resulting two signals from the two sensor film structures 24 is provided to the controller. If the difference S reflects or corresponds to the desired excitation force F (e.g., a complex quantity containing phase and amplitude information), then the controller maintains the excitation voltage unchanged. If the difference S corresponds to a force F1 (e.g., a complex quantity containing phase and amplitude information) offset from F, then the voltages applied to the piezoelectric elements are changed. For example, the change in the voltages may be proportional to F1/F. In some embodiments, the procedure is repeated for increased accuracy. If the response of the test structure is linear, iterations may not be necessary.

In the embodiment of FIG. 3, data indicative of motion of the test structure in response to the excitation forces is captured in an act 314. For example, one or more optical signals from a vibrometer (e.g., a laser Doppler vibrometer) may be directed to the test structure in an act 316 to acquire data indicative of the vibration. Alternative or additional noncontact vibration measurement apparatus may be used. For example, other laser-based measurement techniques may be used.

The order of the above-described acts may vary from the example shown in FIG. 3. For example, some of the acts may be implemented concurrently either in whole or in part. For instance, the force data may thus be acquired as the forces are applied. Additional, fewer or alternative acts may be implemented.

The excitation systems and methods described above control and measure excitation forces as actually applied to a test structure. The magnitude and phase of the excitation may be controlled and measured. Such knowledge of the actual excitation force being applied may be used in conjunction with other measurements of the vibration, such as those captured by a vibrometer. Such knowledge of the actual excitation force may also be useful because the excitation system does not render the force dependent upon the density, geometry and stiffness of the exciter. The disclosed excitation systems are configured such that the exciter does not add any detectable mass, stiffness, or damping to the test structure. The size and other characteristics of the disclosed excitation systems do not affect the measurements due to the integration of the force sensors and other aspects of the disclosed excitation systems described herein. Piezoelectric excitation may thus be used for traveling wave and other types of excitation. Such forces may be useful in measuring the vibration characteristics of, for example, turbomachinery bladed disks.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An excitation system comprising:
a pair of piezoelectric elements configured to apply respective excitation forces to a test structure;
a clamp comprising an adjustable arm, the adjustable arm being configured to capture the test structure between the pair of piezoelectric elements;
a controller coupled to the pair of piezoelectric elements and configured to generate a respective excitation control signal for each piezoelectric element, each excitation control signal being configured such that the respective excitation forces are matched to one another; and
a pair of sensor film structures to generate respective output signals indicative of the excitation forces applied to the test structure, each sensor film structure being disposed between a respective one of the pair of piezoelectric elements and the test structure.

2. The excitation system of claim 1, wherein the adjustable arm is positioned such that the pair of piezoelectric elements, the pair of sensor film structures, and the test structure are clamped under a compressive force during application of the excitation forces.

3. The excitation system of claim 1, wherein each piezoelectric element comprises a respective piezoelectric stack, each piezoelectric stack comprising a plurality of piezoelectric layers.

4. The excitation system of claim 1, wherein the clamp is configured such that the respective excitation forces are collinear.

5. The excitation system of claim 1, wherein the control signals are configured such that the respective excitation forces are equal.

6. The excitation system of claim 1, wherein the control signals are configured such that the respective excitation forces are synchronized to displace the test structure in a common direction.

7. The excitation system of claim 1, wherein the pair of piezoelectric elements are configured such that each excitation force is applied orthogonally to a respective surface of the test structure.

8. The excitation system of claim 1, wherein each sensor film structure comprises a piezoelectric layer configured to present a mass negligible relative to a mass of the test structure.

9. The excitation system of claim 8, wherein each piezoelectric layer comprises a polyvinylidene fluoride layer.

10. The excitation system of claim 1, further comprising a further piezoelectric element in contact with the clamp and positioned to suppress a vibration mode of the clamp.

11. The excitation system of claim 10, wherein the further piezoelectric element is coupled to the controller, and wherein the controller is further configured to generate a vibration suppression control signal configured such that the further piezoelectric element suppresses the vibration mode of the clamp.

12. The excitation system of claim 10, wherein the further piezoelectric element comprises a piezoelectric patch disposed on the adjustable arm of the clamp.

13. The excitation system of claim 1, wherein the clamp is configured with a mass such that respective resonant frequencies of the clamp and the test structure are spaced from one another.

14. The excitation system of claim 1, further comprising a vibrometer disposed adjacent the test structure for optical communication with the test structure to obtain an indication of a motion response to the excitation forces applied to the test structure.

15. A method of force measurement in an excitation system comprising a pair of piezoelectric elements, the method comprising:
  applying matching excitation forces via the pair of piezoelectric elements to a test structure compressed between the pair of piezoelectric elements; and
  measuring the applied excitation forces via a pair of sensor film structures, each sensor film structure being disposed between a respective one of the pair of piezoelectric elements and the test structure and further comprising clamping the pair of piezoelectric elements, the pair of sensor film structures, and the test structure under a compressive force while applying the matching excitation forces.

16. The method of claim 15, wherein applying the excitation forces comprises generating a respective control signal for each piezoelectric element.

17. The method of claim 16, wherein the control signals are configured such that the respective excitation signals are equal and synchronized to displace the test structure in a common direction.

18. The method of claim 15, further comprising suppressing motion in a clamp used in compressing the test structure.

19. The method of claim 18, wherein suppressing the motion comprises providing a suppression control signal to a piezoelectric patch disposed on the clamp.

20. The method of claim 15, further comprising capturing data indicative of motion of the test structure in response to the applied matching excitation forces.

21. The excitation system of claim 1, wherein the pair of piezoelectric elements, the pair of sensor film structures, and the test structure are pre-compressed by the clamp.

* * * * *